United States Patent
Ji et al.

(10) Patent No.: US 9,049,714 B2
(45) Date of Patent: Jun. 2, 2015

(54) INTER-CELL INTERFERENCE COORDINATION METHOD AND APPARATUS FOR AN OFDM-BASED HETEROGENEOUS CELLULAR SYSTEM

(75) Inventors: Hyoung Ju Ji, Seoul (KR); Joon Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 200 days.

(21) Appl. No.: 13/182,045

(22) Filed: Jul. 13, 2011

(65) Prior Publication Data

US 2012/0014333 A1 Jan. 19, 2012

(30) Foreign Application Priority Data

Jul. 13, 2010 (KR) ........................ 10-2010-0067590

(51) Int. Cl.
*H04W 4/00* (2009.01)
*H04W 72/04* (2009.01)
*H04W 52/24* (2009.01)
*H04L 5/00* (2006.01)

(52) U.S. Cl.
CPC ......... *H04W 72/0426* (2013.01); *H04L 5/0007* (2013.01); *H04L 5/0032* (2013.01); *H04L 5/0044* (2013.01); *H04L 5/0062* (2013.01); *H04L 5/0066* (2013.01); *H04L 5/0092* (2013.01); *H04W 52/244* (2013.01)

(58) Field of Classification Search
USPC ................................................ 370/329, 318
See application file for complete search history.

(56) References Cited

U.S. PATENT DOCUMENTS

| | | | | |
|---|---|---|---|---|
| 8,244,262 | B2* | 8/2012 | Lee et al. | 455/450 |
| 8,489,100 | B2* | 7/2013 | Vajapeyam et al. | 455/444 |
| 8,515,427 | B2* | 8/2013 | Vajapeyam et al. | 455/436 |
| 8,583,135 | B2* | 11/2013 | Hiltunen et al. | 455/452.2 |
| 8,611,295 | B2* | 12/2013 | Song et al. | 370/329 |
| 8,687,606 | B2* | 4/2014 | Farley et al. | 370/337 |
| 2009/0270109 | A1 | 10/2009 | Wang Helmersson et al. | |
| 2010/0105406 | A1* | 4/2010 | Luo et al. | 455/452.2 |
| 2010/0144381 | A1* | 6/2010 | Park et al. | 455/501 |
| 2010/0220683 | A1* | 9/2010 | Novak et al. | 370/330 |
| 2010/0255854 | A1* | 10/2010 | Lee et al. | 455/450 |
| 2011/0097998 | A1* | 4/2011 | Ko et al. | 455/41.2 |
| 2011/0190003 | A1* | 8/2011 | Hiltunen et al. | 455/452.1 |
| 2013/0039335 | A1* | 2/2013 | Sundaresan et al. | 370/330 |
| 2013/0244680 | A1* | 9/2013 | Lee et al. | 455/452.1 |
| 2013/0250855 | A1* | 9/2013 | Bhattad et al. | 370/328 |
| 2013/0301458 | A1* | 11/2013 | Barbieri et al. | 370/252 |
| 2013/0301461 | A1* | 11/2013 | Vajapeyam et al. | 370/252 |

OTHER PUBLICATIONS

Necker, "Interference Coordination in Cellular OFDMA Networks", IEEE Network, Nov./Dec. 2008.

* cited by examiner

*Primary Examiner* — Michael J Moore, Jr.
(74) *Attorney, Agent, or Firm* — The Farrell Law Firm, P.C.

(57) ABSTRACT

An inter-cell interference coordination method and apparatus is provided for a heterogeneous network system based on Orthogonal Frequency Division Multiplexing (OFMD) communication. The inter-cell interference coordination method and apparatus exchanges two different types of inter-cell interference coordination messages between base stations to adaptively use the frequency division and time division schemes, thereby coordinating inter-cell interference of control channels transmitted randomly in distributed manner.

18 Claims, 10 Drawing Sheets

INTER-CELL INTERFERENCE COORDINATION METHOD AND APPARATUS FOR AN OFDM-BASED HETEROGENEOUS CELLULAR SYSTEM

PRIORITY

This application claims priority under 35 U.S.C. §119(a) to a Patent Application filed in the Korean Industrial Property Office on Jul. 13, 2010 and assigned Serial No. 10-2010-0067590, the content of which is hereby incorporated by reference.

BACKGROUND OF THE INVENTION

1. Field of the Invention

The present invention relates to an inter-cell interference coordination method and apparatus for a heterogeneous network system based on Orthogonal Frequency Division Multiplexing (OFMD) communication.

2. Description of the Related Art

With advancing technologies, mobile communication systems have evolved to support high speed data communication services as well as standard voice communication services. However, there is a need for more sophisticated mobile communication systems to mitigate resource shortages and meet the high-speed service requirements of the subscribers. In order to fulfill these objectives, many studies have been conducted in various aspects, e.g., minimization of the number of nodes involved in the connections and placing a radio protocol as close as possible to the radio channels.

Long Term Evolution (LTE) is a next generation broadband communication technology developed by the $3^{rd}$ Generation Partnership Project (3GPP). LTE is designed to provide for a downlink speed of up to 100 Mbps. LTE-Advanced (LTE-A) is an evolution of the LTE to which new techniques are added for supporting heterogeneous network architecture. In a heterogeneous cellular system, inter-channel interference is one of the most significant issues in association with the control channel of LTE. Although the inter-cell interference on the data channels can be controlled with cooperation between cells, it is difficult to control the inter-cell interference on the control channels that are transmitted in a distributed manner across the system bandwidth. Therefore, a need exists for an enhanced method and message format for controlling inter-cell interference in a mobile communication system.

SUMMARY OF THE INVENTION

The present invention has been designed to solve the above-described problems occurring in the prior art, and to provide at least the advantages described below.

Accordingly, an aspect of the present invention is to provide an inter-cell interference coordination method and apparatus that are capable of defining and exchanging information for controlling interference efficiently among base stations in adaptation to bandwidth used by heterogeneous cells in an OFDM-based heterogeneous cellular system.

Another aspect of the present invention is to provide an inter-cell interference coordination method and apparatus of a heterogeneous cellular system that are capable of controlling interference through efficient cooperation between cells using newly defined control channel multiplexed with data channel and efficiently distributing inter-cell interference on the new control channel.

In accordance with an aspect of the present invention, a method for transmitting messages for inter-cell interference coordination of a base station in a heterogeneous cellular system is provided. The method includes generating at least two inter-cell interference coordination messages for controlling transmit power to be less than or equal to a predetermined threshold value at least a part of a predetermined control period; transmitting the inter-cell interference coordination message and time information indicating an application timing for controlling the transmit power in the control period; and controlling the transmit power to be less than or equal to the threshold value at the application timing.

In accordance with another aspect of the present invention, a method for receiving messages for inter-cell interference coordination of a base station in a heterogeneous cellular system is provided. The method includes receiving, from a neighbor cell, at least one inter-cell interference coordination message for controlling transmit power of the neighbor cell to be less than or equal to a predetermined threshold value in at least a part of a predetermined control period and time information indicating application timing for controlling the transmit power; and controlling the transmit power of the base station at the application timing by analyzing the inter-cell interference message and time information.

In accordance with another aspect of the present invention, a transmission apparatus of a base station for controlling inter-cell interference in a heterogeneous cellular system is provided. The apparatus includes a generator that generates at least two inter-cell interference coordination messages for controlling transmit power to be less than or equal to a predetermined threshold value at least a part of a predetermined control period; a transmitter that transmits the inter-cell interference coordination message and time information indicating an application timing for controlling the transmit power in the control period; and a controller that controls the transmit power to be less than or equal to the threshold value at the application timing.

In accordance with another aspect of the present invention, a reception apparatus of a base station for controlling inter-cell interference in a heterogeneous cellular system is provided. The apparatus includes a receiver that receives, from a neighbor cell, at least one inter-cell interference coordination message for controlling transmit power of the neighbor cell to be less than or equal to a predetermined threshold value in at least a part of a predetermined control period and time information indicating application timing for controlling the transmit power; and a controller that controls the transmit power of the base station at the application timing by analyzing the inter-cell interference message and time information.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF EMBODIMENTS OF THE INVENTION

Various embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention. Terms and words used in the specification and claims must be regarded as concepts selected by the inventor as the best method of illustrating the present invention, and must be interpreted as having meanings and concepts adapted to the scope and sprit of the present invention to understand the technology of the present invention.

Additionally, although the description is directed to a heteronomous cellular system based on LTE and LTE-A herein, the present invention is not limited thereto. That is, the present invention can be applied to heterogeneous cellular systems based on other types wireless communication technologies.

OFDM is a MultiCarrier Modulation (MOM) scheme for transmitting data through multiple subcarriers in parallel. In an OFDM system, an input symbol stream is divided into several sub-symbol streams and modulated into multiple orthogonal subcarriers for transmission.

An LTE system is a communication system that uses OFDM for downlink transmissions and Single Carrier-Frequency Division Multiple Access (SC-FDMA) for uplink transmissions. An LTE-A system is an advanced LTE system supporting wider bandwidth by aggregating two or more LTE component carriers.

Figure 1:
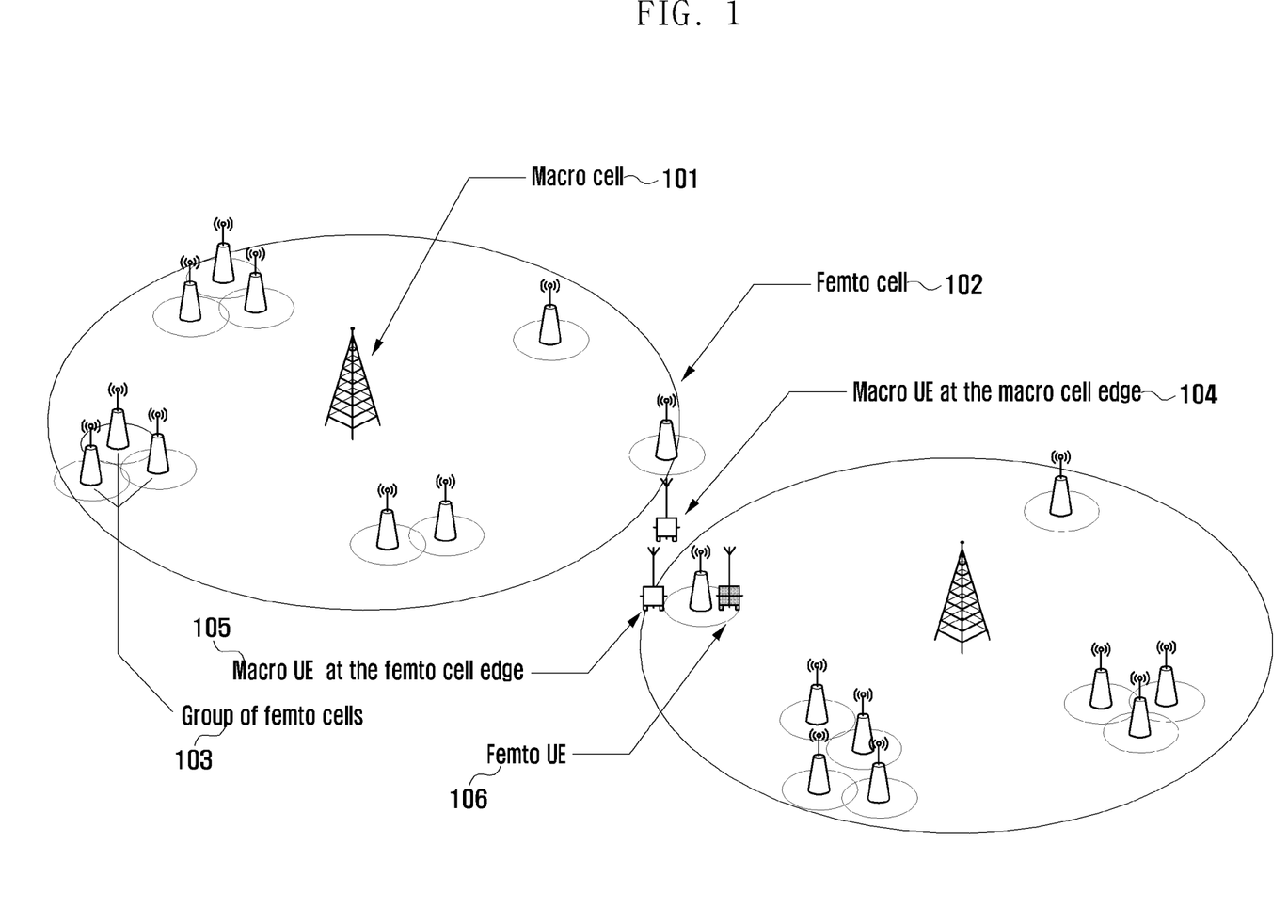
FIG. 1 is a diagram illustrating a heterogeneous cellular system to which the present invention is applied.

FIG. 1 is a diagram illustrating a heterogeneous cellular system to which the present invention is applied.

Referring to FIG. 1, the heterogeneous cellular system includes macro cells 101 and a plurality of femto cells 102 distributed in each macro cell 101. The femto cells can be grouped into a femto cell group 103 or located far away each other. Each femto cell 102 can be an indoor femto cell or an outdoor femto cell.

Because the heterogeneous cellular system is characterized in that the femto cells 102 are installed within the macro cell 101, it is inevitable that the femto cells 102 will increase interference in the macro cell 101. Particularly, if the macro cell 101 and femto cell 102 or another macro cell use the same frequency, this causes performance degradation of the macro User Equipments (UEs) 104 and 105 or the femto cell 106 due to the increase of the interference. Nevertheless, the femto cells 102 also form the high reception quality regions in the macro cell 101.

In the heterogeneous cellular system, the femto cells 102 have small coverage due to their limited transmission power and thus a number of femto cells connected to the macro cell are limited too. Accordingly, the number of UEs connected per base station in the macro cell 101 decreases as the number of femto cells 102 increases in the macro cell 101, resulting in increase of data rate within the macro cell 101.

The interference problem of the heterogeneous cellular system is difficult to solve because the femto cell 102 can be randomly installed by the user. That is, the number of femto cells 102 increases in the high residence density region and, as a consequence, the number of femto cell groups 103 increases too, resulting in increased interference. In such a region, the macro UE 104 and 105 connected to the macro cell 101 may not receive a control channel, resulting in a cut-off of communication.

Particularly in the heterogeneous cellular system including a Closed Subscriber Group (CSG), the macro cells 104 and 105 cannot perform a handover to any femto cell 102 even when the channel condition has deteriorated significantly, resulting in communication failure of a plurality of macro UEs 104 and 105.

In the LTE system, the inter-cell interference on the data channel is controlled with Inter-Cell Interference Coordination (ICIC). The ICIC is achieved by the carrier installing base stations at predetermined locations and predicting the interference in consideration of the locations of the base stations.

Figure 2:
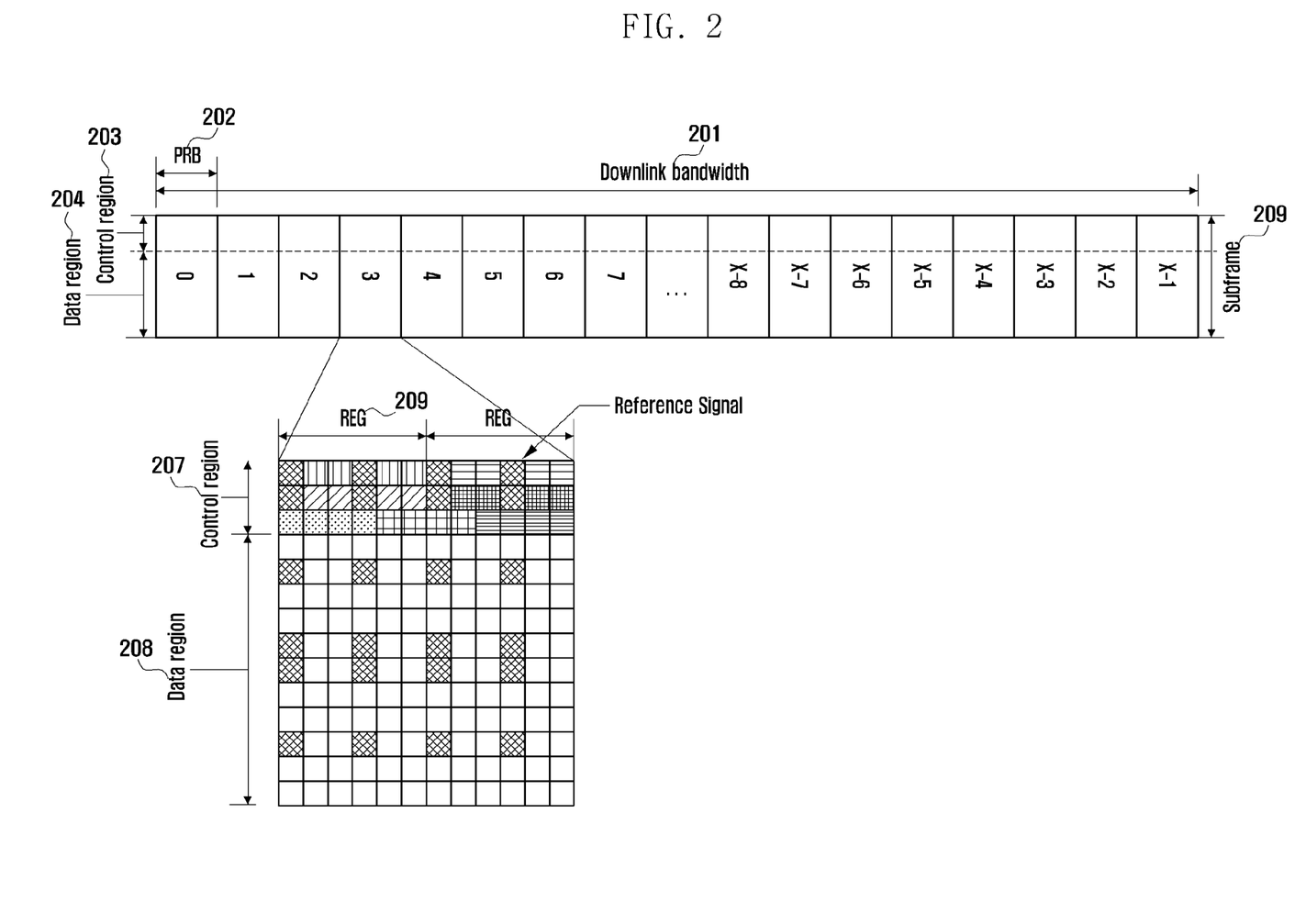
FIG. 2 illustrates a downlink channel configuration of an LTE system according to an embodiment of the present invention.

FIG. 2 illustrates a downlink channel configuration of an LTE system according to an embodiment of the present invention.

Referring to FIG. 2, an entire downlink bandwidth 201 of an LTE system is divided into a plurality of Physical Resource Blocks (PRBs) 202, and each PRB 202 includes a control region 203 (or 207) and a data region 204 (or 208). That is, the downlink bandwidth 201 is divided into two parts on the time axis in such a way that a few symbols at the beginning of a subframe are designated as the control region 203 (or 207) and the remaining symbols are designated as the data region 204 (208). For a data channel, one PRB is used to transmit data for a signal user. However, the control channel includes Resource Element Groups (REGs) 202, each including four Resource Elements (REs) contiguous on the frequency axis, and the REGs 209 are transmitted in a downlink bandwidth 201 in distributed manner. Unlike the data channel in which the received signal strength can be adjusted by the base station controlling the transmit power of each PRB 202, it is difficult to influence the received signal strength at the UE by adjusting the transmit power of one PRB 202. Along with the ICIC adapted to LTE for controlling the inter-cell interference on the data channel, there is a need of a method for controlling the inter-cell interference on the control channel.

Figure 3:
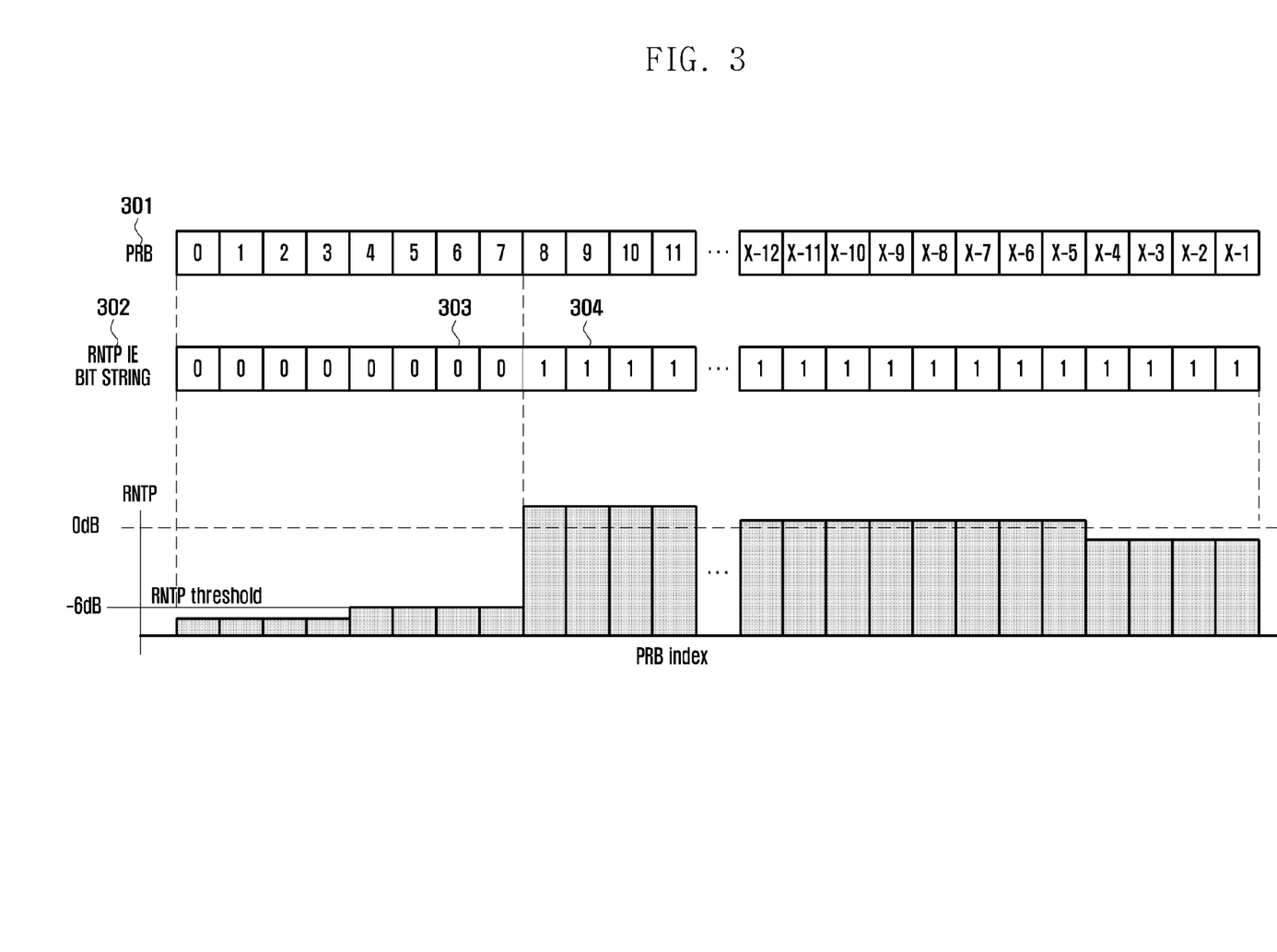
FIG. 3 illustrates a message for controlling inter-cell interference in an LTE system according to an embodiment of the present invention.

FIG. 3 illustrates a message for controlling inter-cell interference in an LTE system according to an embodiment of the present invention.

Referring to FIG. 3, the eNBs use a message having a Related Narrow Transmit Power Information Element (RNTP IE) for controlling inter-cell interference. For example, this message can be configured as shown in Table 1.

TABLE 1

| IE/Group Name | Presence | Range | IE type and reference | Semantics description |
|---|---|---|---|---|
| RNTP Per PRB | M | | BIT STRING (6 ... 110, ...) | Each position in the bitmap represents a $n_{PRB}$ value (i.e., first bit = PRB 0 and so on), for which the bit value represents RNTP ($n_{PRB}$), defined in [11]. Value 0 indicates "Tx not exceeding RNTP threshold". Value 1 indicates "no promise on the Tx power is given". |
| RNTP Threshold | M | | ENUMERATED (−∞, −11, −10, −9, −8, −7, −6, −5, −4, −3, −2, −1, 0, 1, 2, 3, ...) | $RNTP_{threshold}$ is defined in [11]. |
| Number Of Cell-specific Antenna Ports | M | | ENUMERATED (1, 2, 4, ...) | P (number of antenna ports for cell-specific reference signals) defined in [10]. |
| P_B | M | | INTEGER (0 ... 3, ...) | $P_B$ is defined in [11]. |
| PDCCH Interference Impact | M | | INTEGER (0 ... 4, ...) | Measured by Predicted Number Of Occupied PDCCH OFDM Symbols (see [10]). Value 0 means "no prediction is available". |

The RNTP is the information element indicating the relative power ratio, i.e., the ratio of the transmit power to the average power, and the eNB selects the PRB for limiting its transmit power to the relative power ratio, generates the message as shown in Table 1 with the RNTP threshold, and transmits the message to adjacent cells. For example, in order to mitigate interference to the neighbor cells in limited PRBs 303, i.e., PRBs #0 to #7, among the entire downlink PRBs 301, the eNB notifies the neighbor cells of the RNTP value of the corresponding region, which is set to −6 dB, along with the RNTP IE bitmap information (RNTP IE BITMAP indication, RNTP IE BIT STRING) 302 corresponding to the PRBs 301 of the entire downlink bandwidth. The eNB sets the bit value of 0 in correspondence to the limited PRBs 303 corresponding to #0 to #7 to which the RNTP value is applied among the PRBs 301 and sets the bit value of 1 in correspondence to the non-limited PRB 304 corresponding to #8 to #X-1 to which the RNTP value is not applied so as to generate the RNTP IE bitmap information. The eNB notifies the neighbor cells of the information such as a number of antenna, data and antenna power ratio, and estimation value of the control region such that the neighbor cells can calculate the expected reception power.

The eNB adjusts the transmit power in the range less than or equal to the RNTP value for the limited PRBs 303. The eNB can adjust the transmit powers of the limited PRBs 303 to be equal to each other or different from each other. The eNB also can adjust the transmit power or the non-limited PRBs 304 to a certain value, e.g., the transmit power of the non-limited PRBs 304 to a value in the range above the RNTP value. The eNB can adjust the transmit powers of the non-limited PRBs 304 to the same value or different values. In this manner, with the receipt of the RNTP IE, as shown in Table 1, the neighbor cells can predict the suppression of the interference in the limited PRBs 303 through RNTP IE analysis and improve the reception performance of the UE located at the cell boundary by allocating the limited PRBs 303 to the UE.

In the LTE system, the inter-cell interference of the control channel is controlled using the RNTP IE on the time axis. An embodiment of the present invention proposes a method for controlling inter-cell interference of the control channel on the time axis, as well as the frequency axis, because it is possible to manage the time-divided control and data channels on the time axis.

Figure 4:
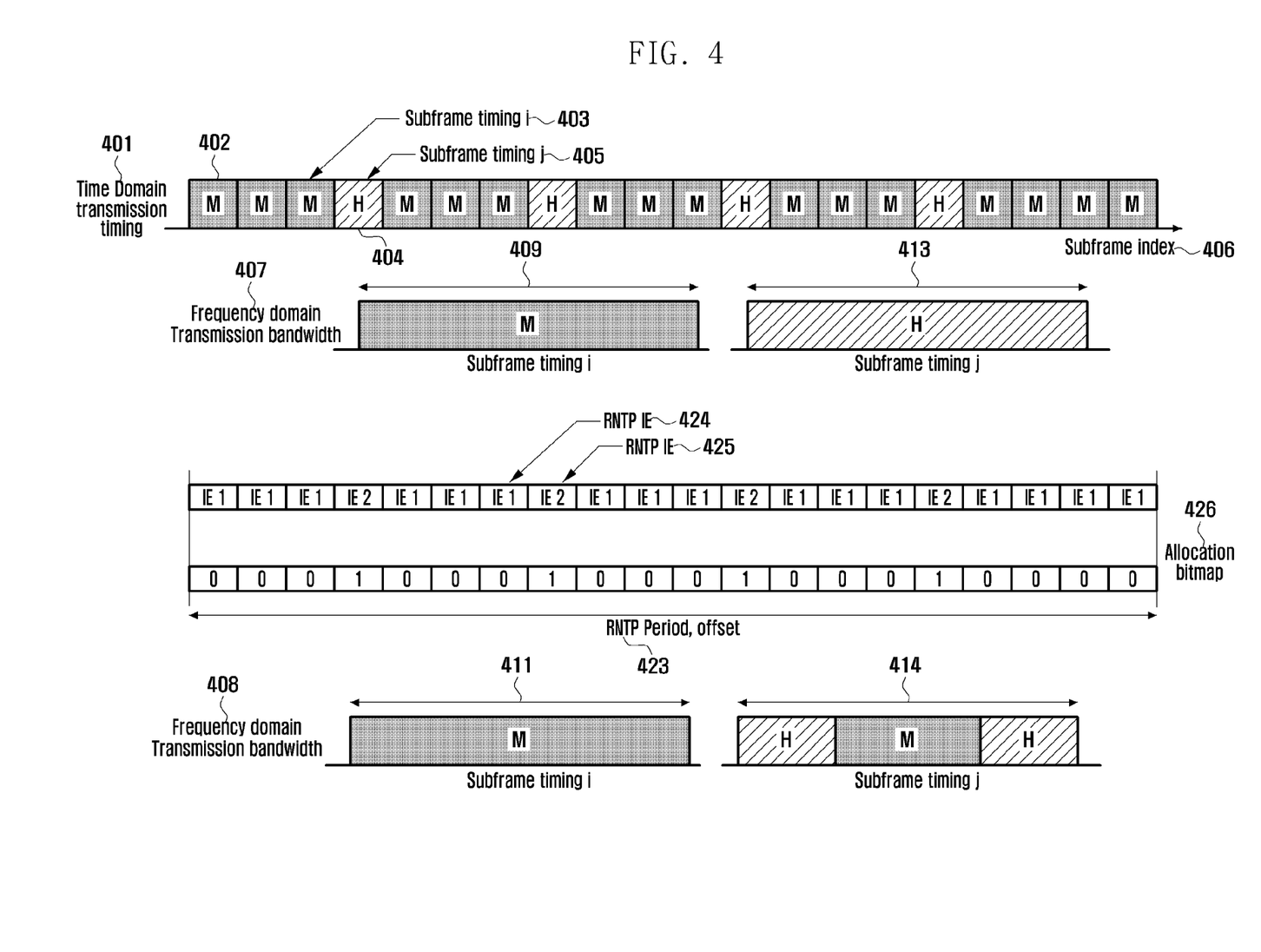
FIG. 4 illustrates a downlink subframe for controlling inter-cell interference according to an embodiment of the present invention.

FIG. 4 illustrates a downlink subframe for controlling inter-cell interference according to an embodiment of the present invention.

Referring to FIG. 4, the downlink subframe includes macro regions 402 for macro cell transmission and femto regions 404 according to the time domain transmission timing 401. That is, the macro cell performs downlink transmission in the macro region 402 corresponding to a predetermined subframe timing i 403, and the femto cell performs downlink transmission in the femto region 404 corresponding to a predetermined subframe timing j. As the macro and femto cells are performing downlink transmissions at different timings in a predetermined pattern, the UE can avoid the interference from other eNBs, i.e., macro and femto eNBs, in a certain downlink subframe.

The macro and femto cells perform the downlink transmissions according to the frequency transmission bandwidth 407 in the downlink subframe. That is, the macro cell performs downlink transmission through an entire frequency band 409 at the subframe timing i 403. The femto cell performs downlink transmission through the entire frequency band 413 at the subframe timing j 405.

The time division-based inter-cell interference coordination is efficient to reduce the inter-cell interference but not advantageous in view of the frequency reuse because the frequency is used once at a time point. That is, when there are very few devices connected to the femto cell, the time division-based inter-cell interference coordination is efficient; but when there are large number of femto cells or the UEs connected to the femto cells and the femto cells are not using the entire frequency band, the time division-based inter-cell interference coordination is likely to cause resource waste. Accordingly, an embodiment of the present invention is capable of controlling the inter-cell interference with the RNTP IE, as well as using the time division method, and allows the neighbor cells to predict interference on the control channel and the data channel.

According to an embodiment of the present invention, the base station transmits two RNTP IEs 424 and 425 and the transmission timings of the respective RNTP IEs 424 and 425 to the neighbor cells. For this purpose, the eNB generates the two RNTP IEs 424 and 425 with an RNTP IE value to be applied to the subframe transmitted by a cell matching the eNB itself in type and another RNTP IE value to be applied to the subframe transmitted by a cell different from the eNB itself in type, and configures the time information 423 such as offset and RNTP period. That is, the eNBs exchange RNTP IEs 424 and 425 to coordinate the inter-cell interference.

In accordance with an embodiment of the present invention inter-cell interference is dynamically controlled when the heterogeneous cells use different bandwidth or some part of the entire bandwidth and has higher spectral efficiency as compared to the time division-based method. Also, accordance with an embodiment of the present invention, an inter-cell interference coordination method optimizes interference within a cell with power control and simply adjusting transmission according to the interference amount between cells interfering with each other.

That is, the RNTP IE1 424 is transmitted in a subframe for interference control with a neighbor eNB, which is different in type and which performs transmitting at the same timing with the current eNB, and the RNTP IEs 425 is transmitted in the subframe for interference control with another neighbor eNB. If the two cells are the same type, the two cells are on the same hierarchical layers in the heterogeneous cellular system. For example, a macro cell can transmit the RNTP IE1 424 to another macro cell and the RNTP IE2 425 to a femto cell within the coverage of the macro cell. The eNB determines the time information 423 such as the subframe timing and cycle associated with the two RNTP IEs 424 and 425 and configures an allocation bitmap 426 indicating the allocation structure of the RNTP IEs 424 and 425. The eNB also notifies of time information 423 such as the timings of the two RNTP IEs 424 and 425, available period of the allocation bitmap 426, and actual application timings.

The macro and femto cells perform transmission in a downlink subframe in correspondence to a frequency domain transmission bandwidth 408. That is, the macro cell performs downlink transmission through the entire frequency bandwidth 411 at the corresponding subframe timing i 403. The macro cell also performs downlink transmission through a part of the entire frequency bandwidth 414 at the corresponding subframe timing j 405. The femto cell performs downlink transmission through the remained part of the entire frequency bandwidth 414 at the subframe timing j. That is, at the subframe timing j 405 for the femto cell, the macro and femto cells can use the entire frequency band 404.

Figure 5A:
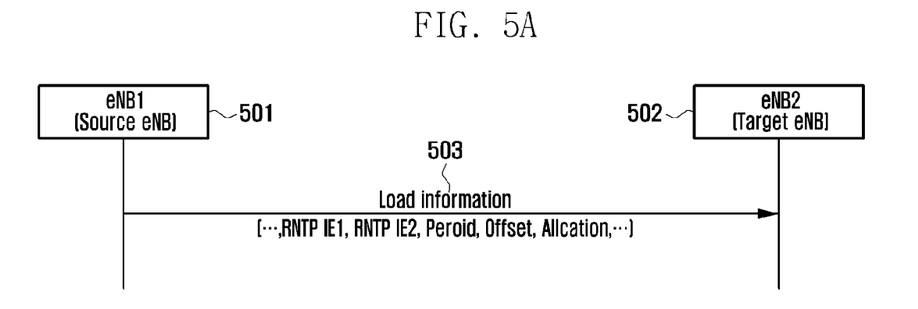
FIGS. 5A to 5C are signaling diagrams illustrating message exchanges between evolved Node Bs (eNBs) for inter-cell interference coordination according to an embodiment of the present invention.
Figure 5B:
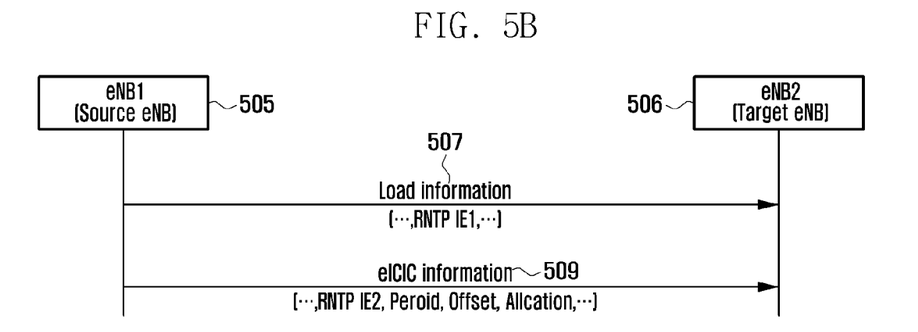
Figure 5C:
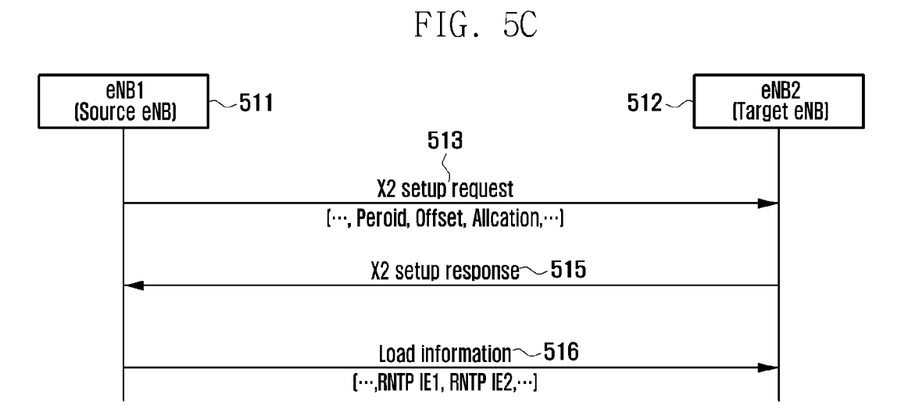

FIGS. 5A to 5C are signaling diagrams illustrating message exchanges between eNBs for inter-cell interference coordination according to an embodiment of the present invention.

Referring to FIG. 5A, in an LTE system a source eNB (eNB1) 501 transmits a load information message 503, as the inter-cell interference coordination message, including the two RNTP IEs to the target eNB (eNB2) 502. Although the load information message is received, the target eNB 506 does not reply. The load information message includes two RNTP IEs and time information. That is, the source eNB 501 transmits the RNTP IE1 for the same hierarchical eNB, the RNTP IE2 for the different hierarchical eNB, and the time information for application of the RNTP IE1 and RNTP IE2 via the load information message. The RNTP IE1 is configured as shown in Table 1, and the RNTP IE2 can also be configured as shown in Table 1 or with some of the fields of Table 1. That is, the fields used by the RNTP IE1 can be excluded for the RNTP IE2.

If source and target eNBs 501 and 502 are the same hierarchical eNBs, the target eNB 502 analyzes the RNTP IE1 and time information to control the inter-cell interference. Otherwise, if source and target eNBs 501 and 502 are different hierarchical eNBs, the target eNB 502 analyzes the RNTP IE2 and time information to control the inter-cell interference.

Referring to FIG. 5B, in the LTE system the source eNB 505 transmits a load information message 507, as the inter-cell interference coordination message, to the target eNB 506. Here, the load information message includes one RNTP IE. Although the load information message is received, the target eNB 506 does not reply. The source eNB 505 transmits the hierarchical eICIC information 509 to the target eNB 506. Although the hierarchical control (eICIC) information message is received, the target eNB 506 does not reply. The hierarchical control (eICIC) information message includes one RNTP IE and time information. That is, the source eNB 505 transmits the RNTP IE1 for the same hierarchical eNB using the load information message, and the RNTP IE2 for the different hierarchical eNB and the time information for application of the RNTP IE1 and RNTP IE2 using the hierarchical control (eICIC) information message. The RNTP IE1 can be configured as shown in Table 1, and the RNTP IE2 can be configured as shown in Table 1 or with some of the fields listed in Table 1. As described above, the fields used by the RNTP IE1 can be excluded for use in the RNTP IE2.

If source and target eNBs 505 and 506 are the same hierarchical eNBs, the target eNB 506 analyzes the RNTP IE1 of the load information message and time information of the hierarchical control (eICIC) information message to control the inter-cell interference. Otherwise, if source and target eNBs 505 and 506 are different hierarchical eNBs, the target eNB 506 analyzes the RNTP IE2 and time information of the hierarchical control (eICIC) information message to control the inter-cell interference.

Referring to FIG. 5C, prior to transmitting the load information message as the inter-cell interference coordination message, the source eNB 511 transmits an X2 setup request message 513 including time information for application of the two RNTP IEs to the target eNB 512. If the X2 setup request message 513 is received form the source eNB 511, the target eNB 512 transmits an X2 setup response message 515 to the source eNB 511 in response to the X2 setup request message. Upon receipt of the X2 setup response message 515, the source eNB 511 transmits the load information message 516 to the target eNB 512. Here, the load information message 516 includes two RNTP IEs. The RNTP IE1 can be configured as shown in Table 1, and the RNTP IE2 can be configured as shown in Table 1 or with some of the fields listed in Table 1. That is, the fields used by the RNTP IE1 can be excluded for the RNTP IE2.

The time information is transmitted in the X2 setup request message 513 because the timing for applying the inter-cell interference coordination on the time axis is closely related with the inter-cell synchronization. That is, if the inter-cell synchronization is not acquired, it is difficult to expect the inter-cell interference coordination effect according to the inter-cell interference coordination on the time axis. Accordingly, the time information on the inter-cell interference coordination application timing on the time axis of each cell is transmitted using the X2 setup message requiring replay rather than a unidirectional message such as load information message requiring no reply.

If source and target eNBs 511 and 512 are the same hierarchical eNBs, the target eNB 512 analyzes the RNTP IE1 and time information to control the inter-cell interference. Otherwise, if source and target eNBs 511 and 512 are different hierarchical eNBs, the target eNB 512 analyzes the RNTP IE2 and time information to control the inter-cell interference.

Figure 6A:
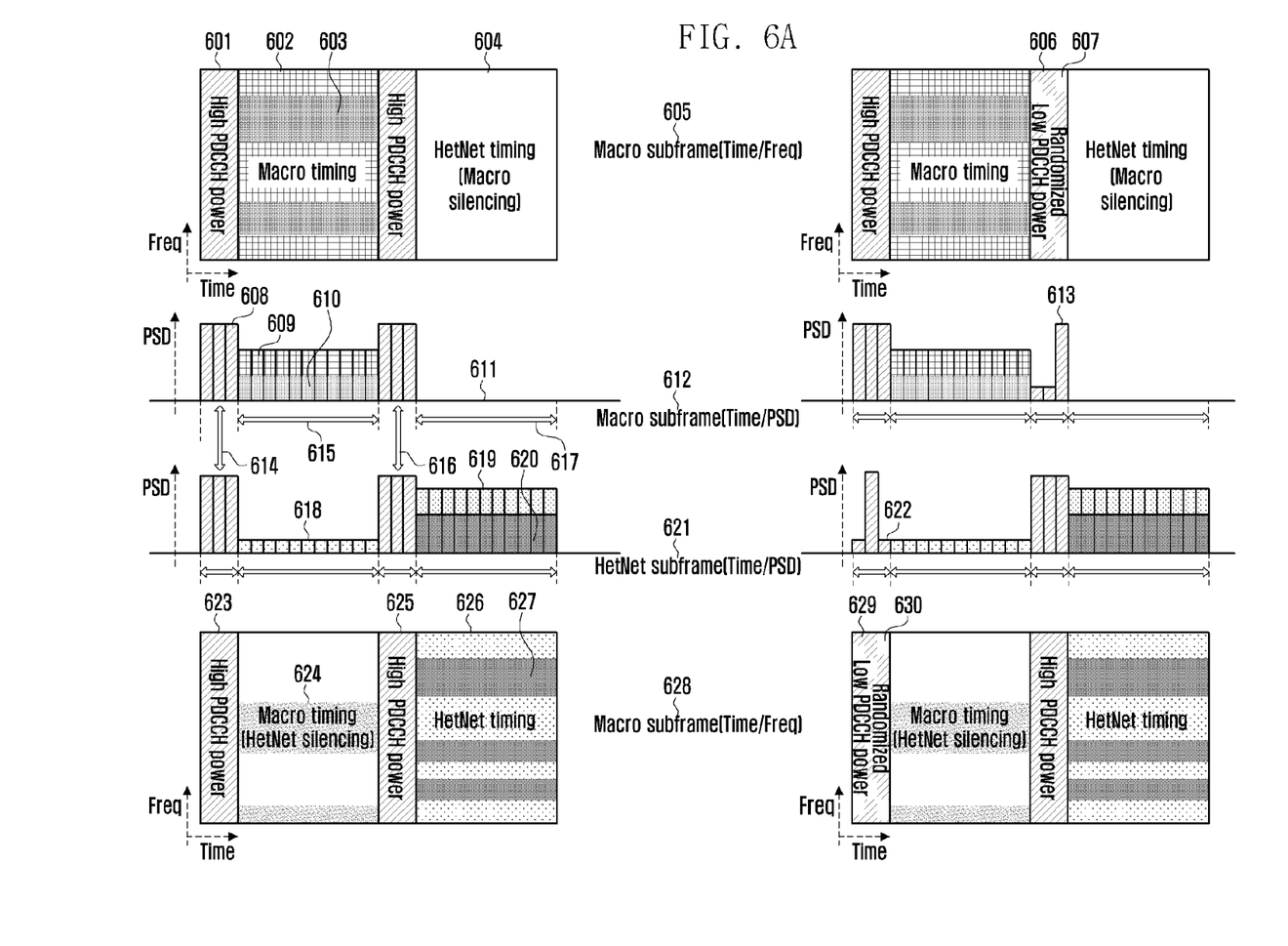
FIG. 6A illustrates a subframe for use in an inter-cell interference coordination method according to an embodiment of the present invention.

FIG. 6A illustrates a subframe for use in an inter-cell interference coordination method according to an embodiment of the present invention.

Referring to FIG. 6A, average interference increase/decrease of the transmit power is exchanged in the control region between cells, i.e., the method transmits increase/decrease of the average power in the form of a bitmap information in unit of CCE or REG or a representative value. The RNTP IE is the information limited to the data region 602 and 626 regardless of its application timing. Because the transmit power of the control region 601 and 623 is changed according to the location of the UE in the cell and it is transmitted across a few symbols due to the characteristic of the control channel, it is impossible to decrease the interference using the RNTP IE. Accordingly, inter-cell synchronization is additionally acquired to protect the control region. In the system that does not support supplementary inter-cell synchronization in the control region, such as a Time Division Duplexing (TDD) system, but require complete synchronization, it is difficult to apply the inter-cell interference coordination to the control region 601 and 623. Therefore, there is a need of a method for exchanging power information of the control region 601 and 623 between cells.

If the power of some control channels of the control region 601 and 623 decreases, a UE is located near the eNB or has good channel condition so as to receive the control channel at low power level, and thus, if the power of the corresponding control channel decreases, the power in certain partial resource 606 and 607 of the control region 601 and 623 decreases. In this case, it is possible for the interference on the control channel transmitted to a UE decreases in view of the hierarchical cell interfered. Accordingly, if the eNB notifies of the decrease of the transmit power of the control channel, the power decreases in a certain resource 606 and 607 of the control region 601 and 623 such that the eNB received this information can determine whether the average interference of the UE decreases within the cell of the eNB.

Figure 6B:
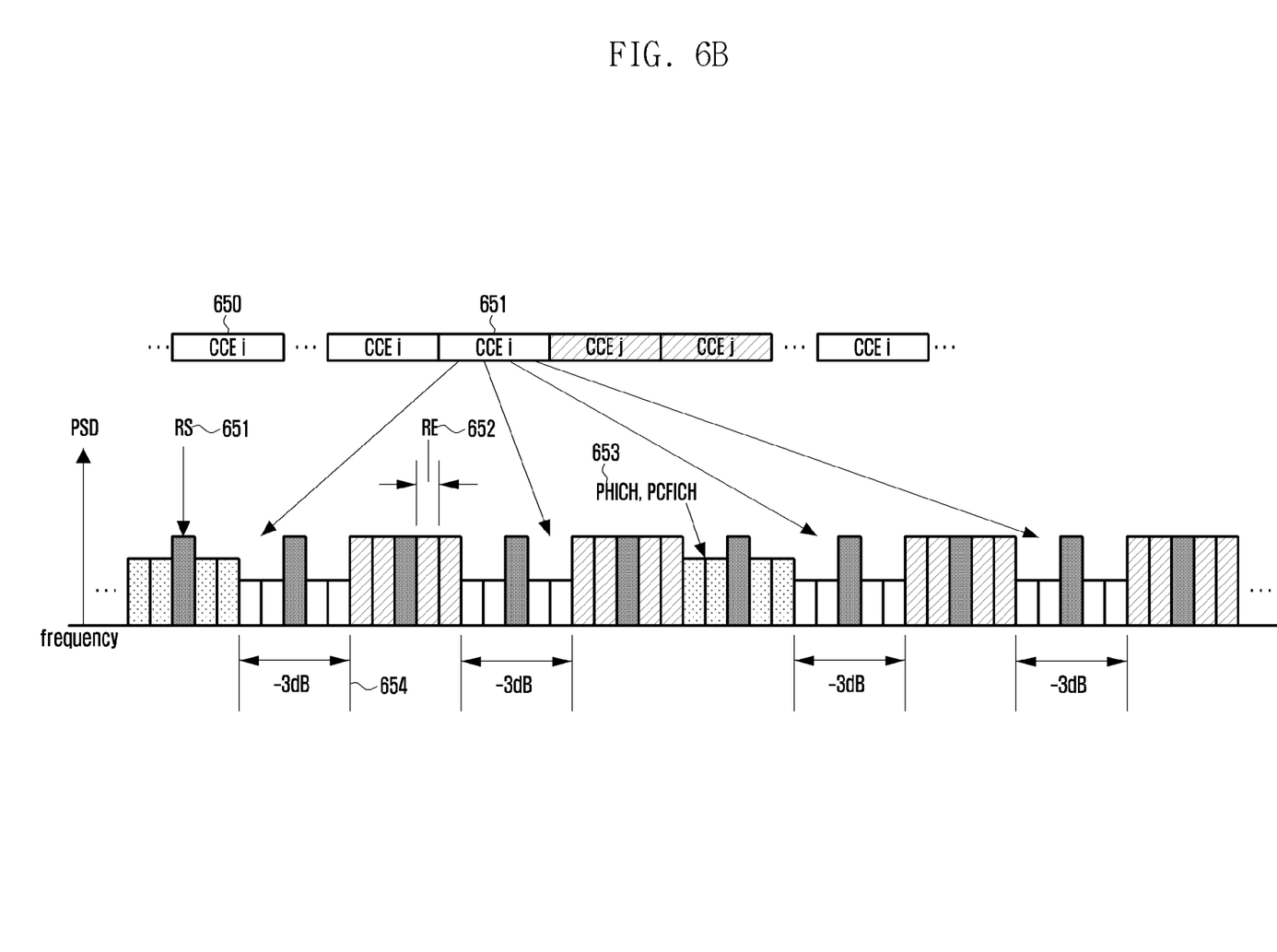
FIG. 6B illustrates a control channel interference control structure according to an embodiment of the present invention.

FIG. 6B illustrates a control channel interference control structure according to am embodiment of the present invention.

Referring to FIG. 6B, one control channel includes a plurality of CCEs 650 and 651. When notifying of the interference information in a unit of a CCE, the control channel include a total of 8 CCEs, four CCE are randomly distributed, the transmit power decreases as much as 3 dB, and the interference is reduced as much as 25%. The eNB that has received this information can secure the control channel performance of the UE in the corresponding cell with much less power and resource.

The present invention can define PDCCH RNTP IE for transferring information on the average control channel, and the PDCCH RNTP IE can be notified by one of the following three methods.

The first method is to use a representative value. The representative value can be defined as shown below by Equation (1).

The second method is to notify of the bitmap information per CCE, and the third method is to notify the bitmap information per REG. Because the method for notifying of the bitmap information per CCE is capable of locating CCE accurately based on the number of antenna of the counterpart eNB and the cell ID, it is possible to check the low interference location. The method for notifying of the bitmap information per REG is the method for indicating the location more accurately with higher reception performance for the control channels, such as PHICH and PCFICH that are distributed in unit of REG, as compared to PDCCH.

$$\text{Representative value} = \text{number of CCEs adopting RNTP threshold/total number of CCEs} \quad (1)$$

Figure 7A:
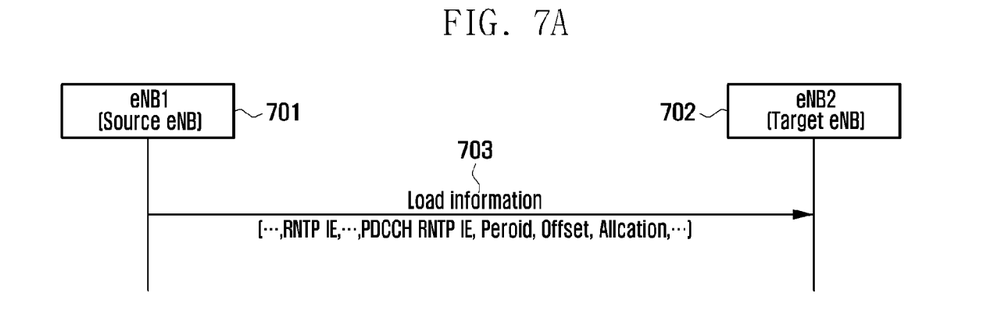
FIGS. 7A to 7C illustrates message exchanges between eNBs for inter-cell interference coordination according to an embodiment of the present invention.
Figure 7B:
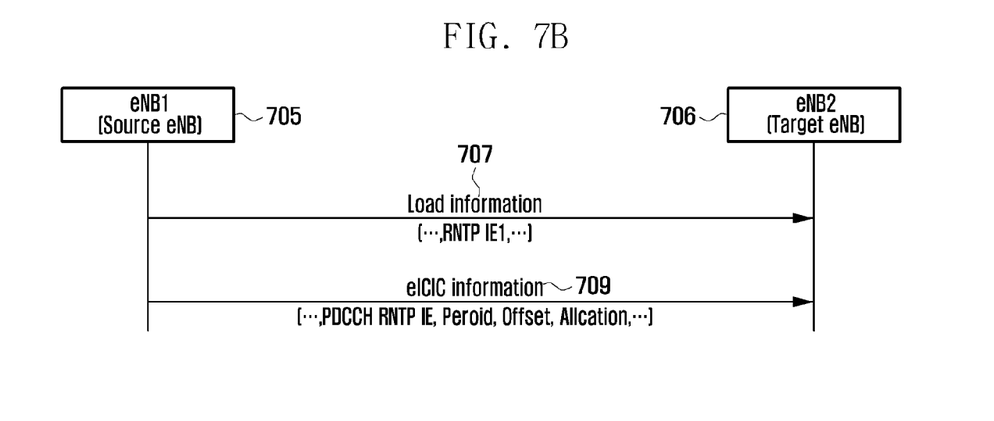
Figure 7C:
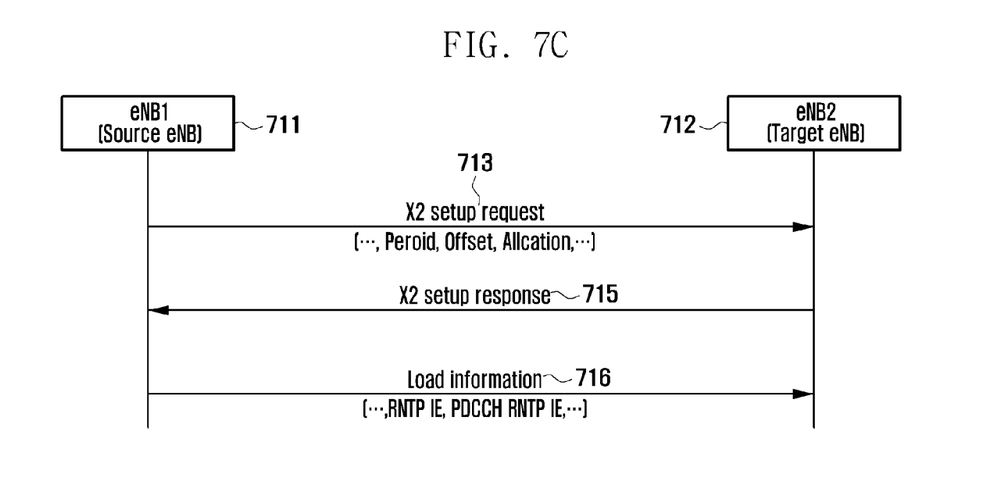

FIGS. 7A to 7C are signaling diagram illustrating exemplary message exchanges between eNBs for inter-cell interference coordination according to an embodiment of the present invention.

Referring to FIG. 7A, in an LTE system, a source eNB 701 sends a target eNB 702 a load information message 703 including the RNTP IE and PDCCH RNTP IE as inter-cell interference coordination message. Although the load information message 703 is received, the target eNB 702 does not reply. Here, the load information message 703 includes the RNTP IE, PDCCH RNTP IE, and time information. That is, the source eNB 701 transmits the RNTP IE for data channel, the PDCCH RNTP IE for control channel, and time information for application of the RNTP IE and PDCCH RNTP IE by means of the load information message. The RNTP IEE can be configured as shown in Table 1, and the RNTP IE2 can be configured as shown in Table 1 or with some of the fields of Table 1. That is, the fields used by the RNTP IE1 can be excluded for the PDCCH RNTP.

The target eNB 702 analyzes the RNTP IE and time information and uses the analysis result for inter-cell interference coordination for data channel. The target eNB 502 also analyses the PDCCH RNTP IE and time information and uses the analysis result for inter-cell interference coordination for control channel.

Referring to FIG. 7B, in the LTE system, a source eNB 705 sends a target eNB 706 a load information message 707 as inter-cell interference coordination message. The load information message 707 includes the RNTP IE. Although the load information message 707 is received from the source eNB 705, the target eNB 706 does not reply.

Thereafter, the source eNB 705 sends the target eNB 706 a hierarchical control (eICIC) information message 709. Although the eICIC information message 709 is received from the source eNB 705, the target eNB 706 does not reply. The eICIC information message 709 includes the PDCCH RNTP IE and time information. That is, the source eNB 705 transmits the RNTP IE for data channel using the load information message 707 and the PDCCH RNTP IE and the time information for application of the RNTP IE and PDCCH RNTP IE using the eICIC information message 709. The RNTP IE can be configured as shown in Table 1, and the PDCCH RNTP IE can be configured as shown in Table 1 or with some of the fields listed in Table 1. That is, the fields used by the RNTP IE can be excluded for use in PDCCH RNTP IE.

The target eNB 706 analyzes the RNTP IE of the load information message 707 and the time information of the eICIC information message 703 and uses the analysis result for the inter-cell interference coordination on the data channel. The target eNB 706 also analyzes the PDCCH RNTP IE and time information of the eICIC information message 709 and uses the analysis result for the inter-cell interference coordination on the control channel.

Referring to FIG. 7C, prior to transmitting the load information message 707 as the inter-cell interference coordination message, the source eNB 711 sends the target eNB 712 an X2 setup request message 713 including time information for application of the RNTP IE and PDCCH RNTP IE.

If the X2 setup request message 713 is received form the source eNB 711, the target eNB 712 transmits an X2 setup response message 715 to the source eNB 711 in response to the X2 setup request message 713. Upon receipt of the X2 setup response message 715, the source eNB 711 transmits the load information message 716 to the target eNB 712. The load information message 716 includes the RNTP IE and the PDCCH RNTP IE. The RNTP IE can be configured as shown in Table 1, and the PDCCH RNTP IE can be configured as shown in Table 1 or with some of the fields listed in Table 1. That is, the fields used by the RNTP IE can be excluded for use in the PDCCH RNTP IE.

The time information is transmitted in the X2 setup request message 713 because the timing for applying the inter-cell interference coordination on the time axis is closely related with the inter-cell synchronization. That is, if the inter-cell synchronization is not acquired, it is difficult to expect the inter-cell interference coordination effect according to the inter-cell interference coordination on the time axis. Accordingly, the time information on the inter-cell interference coordination application timing on the time axis of each cell is transmitted using the X2 setup message requiring reply rather than a unidirectional message such as load information message requiring no reply.

The target eNB 712 analyzes the RNTP IE and time information and uses the analysis result for inter-cell interference coordination of the data channel. The target eNB 712 also analyzes the PDCCH RNTP IE and time information and uses the analysis result for inter-cell interference coordination of the control channel.

Figure 8:
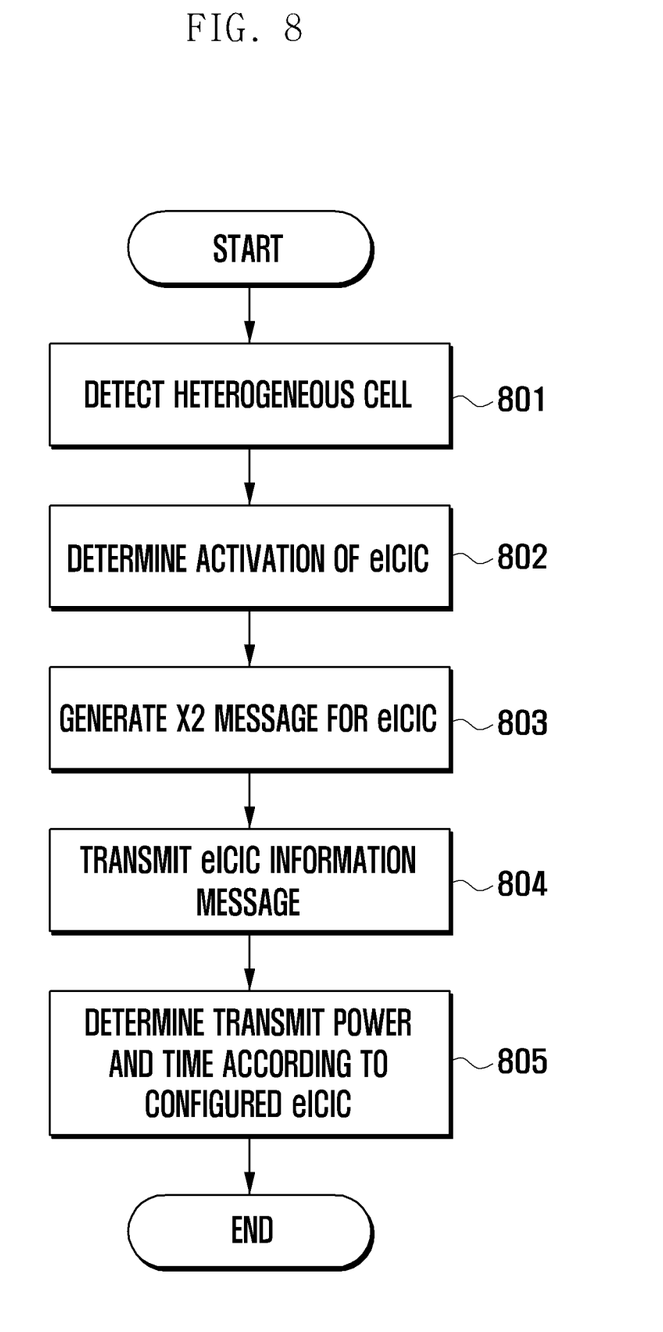
FIG. 8 is a flowchart illustrating a procedure of a source eNB in an inter-cell interference coordination method according to an embodiment of the present invention.

FIG. 8 is a flowchart illustrating a procedure of a source eNB in an inter-cell interference coordination method according to an embodiment of the present invention.

Referring to FIG. 8, a source eNB detects a heterogeneous cell environment in step 801. In step 802, the source eNB determines whether to activate inter-cell interference cooperation (eICIC). The source eNB generates the inter-cell exchange message for inter-cell interference coordination in step 803. The source eNB transmits the inter-cell interference coordination message in step 804. In step 805, the source eNB configures the power and control application timing as indicated in the inter-cell interference coordination message.

That is, the source eNB generates at least two inter-cell interference coordination messages for controlling the transmit power below a predetermined threshold value in part of a predetermined control period. The source eNB sends neighbor cells the time information representing the application timing for controlling the transmit power in the control period by using the inter cell interference coordination message. Afterward, the source eNB controls the transmit power to be less than or equal to the threshold value at the application timing.

The source eNB includes a message generator, a transmitter, and a controller. The message generator generates at least two inter-cell interference coordinate messages for controlling the transmit power to be less than or equal to a predetermined threshold value in at least a part of the predetermined control period. The transmitter transmits the time information indicating the application timing of the transmit power control in the control period by using the inter-cell interference coordination messages. The controller controls the transmit power to be less than or equal to the threshold value.

One of the inter-cell interference coordination messages includes the RNTP IE for the eNB operating at the same hierarchical level with the source eNB and the other includes the RNTP IE for the eNB operating at the different hierarchical level with the source eNB. Also, one of the inter-cell interference coordination messages includes the RNTP IE for controlling the transmit power of data channel in a subframe, and the other includes the PDCCH RNTP IE for controlling the transmit power of control channel in the subframe.

Figure 9:
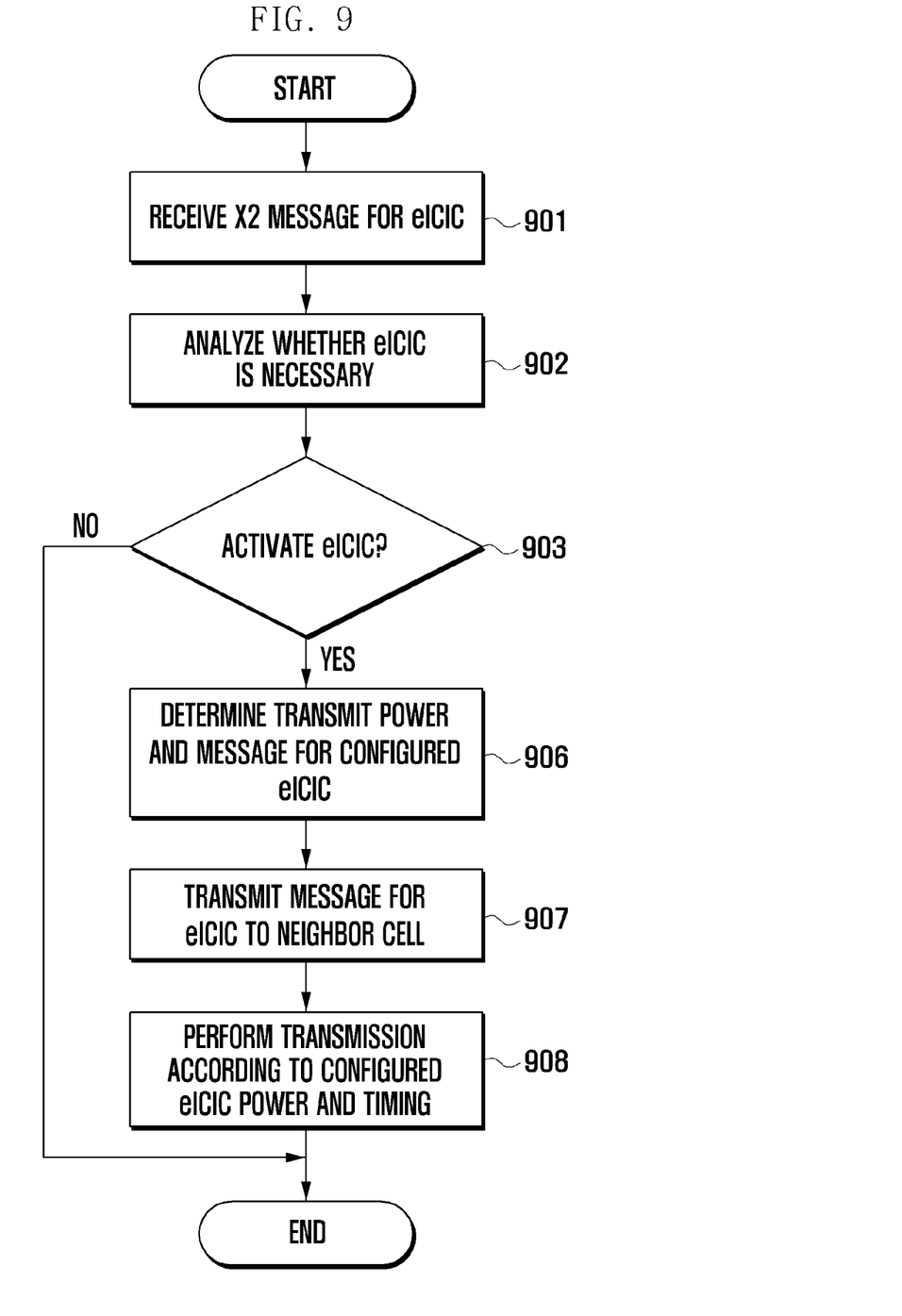
FIG. 9 is a flowchart illustrating a procedure of a target eNB in an inter-cell interference coordination method according to an embodiment of the present invention.

FIG. 9 is a flowchart illustrating a procedure of a target eNB in an inter-cell interference coordination method according to an embodiment of the present invention.

Referring to FIG. 9, a target eNB receives an inter-cell exchange message for enhanced inter-cell interference coordination in step 901. In step 902, the target eNB analyzes the message to determine the necessity of inter-cell interference cooperation. In step 903, the target eNB determines whether the inter-cell interference cooperation is necessary. If it is determined that the inter-cell interference cooperation is not necessary, the target eNB ignores the message. Otherwise, if it is determined that the inter-cell interference cooperation is necessary, the target eNB determines the transmit power and timing of its own cell using the inter-cell interference coordination message received from neighbor cells in step 906. In step 907, the target eNB transmits the inter-cell interference coordination message generated by itself to the neighbor cell. Finally, the target eNB performs transmission at the transmit power with the transmission timing in step 908.

That is, the target eNB receives at least one inter-cell interference coordination message for controlling the transit power of the neighbor cell to be less than or equal to the predetermined threshold value in some part of the predetermined control period and the time information indicating the application timing of transmit power control in the control period from neighbor cells. The target eNB analyzes the inter-cell interference coordination message and time information and controls the transmit power of the eNB at the application timing.

For this purpose, the target eNB includes a receiver and a controller. The receiver receives at least one inter-cell interference coordination message for controlling transmit power of the neighbor cell to be less than or equal to the predetermined threshold value in a part of the predetermined control period and the time information indicating the timing for controlling the transmit power in the control period. The controller analyzes the inter-cell interference message and time information and controls the transmit power of the eNB at the application timing.

Here, the inter-cell interference coordination message can include the RNTP IE for the eNB operating at the same hierarchical level in the heterogeneous cellular system or the RNTP IE for the eNB operating at the different hierarchical level. The inter-cell interference coordination message can include the RNTP IE for controlling the transmit power on the data channel of a subframe and the PDCCH RNTP IE for controlling the transmit power on the control channel of the subframe.

As described above, the inter-cell interference coordination method for the OFDM-based heterogeneous cellular system according to the present invention is capable of mitigating inter-cell interference on both the control channel and data channel through the cooperation among the cells at an application timing with two independent downlink power information elements exchanged therebetween. Also, the inter-cell interference coordination method of the present invention is capable of guaranteeing enhanced control channel performance and coordinating inter-cell interference between heterogeneous cells using different bandwidths by controlling the average power of control channel.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. A method for transmitting messages for inter-cell interference coordination of a source base station and a target base station in a heterogeneous cellular system, the method comprising the steps of:
generating, by the source base station, first inter-cell interference coordination information and second inter-cell interference coordination information, the first inter-cell interference coordination information and the second inter-cell interference coordination information being associated with a first subframe and a second subframe, respectively;
transmitting, by the source base station to the target base station, the first inter-cell interference coordination information, the second inter-cell interference coordination information, a resource allocation bitmap indicating an allocation structure of at least one of the first inter-cell interference coordination information and the second inter-cell interference coordination information, and time information indicating at least one of the first subframe and the second subframe; and
applying, by the source base station, the first inter-cell interference coordination information and the second inter-cell interference coordination information to the at least one of the first subframe and the second subframe.

2. The method of claim 1, wherein one of the first inter-cell interference coordination information and the second inter-cell interference coordination information is transmitted to a neighbor base station operating at a same hierarchical level, and another of the first inter-cell interference coordination information and the second inter-cell interference coordination information is transmitted to a neighbor base station operating at a different hierarchical level.

3. The method of claim 1, wherein one of the first inter-cell interference coordination information and the second inter-cell interference coordination information is transmitted for controlling the transmit power of a data channel of a subframe, and another of the first inter-cell interference coordination information and the second inter-cell interference coordination information is transmitted for controlling the transmit power of a control channel of the subframe.

4. The method of claim 3, wherein the first inter-cell interference coordination information and the second inter-cell interference coordination information includes at least one of a representative value obtained by dividing a number of Control Channel Elements (CCEs) for controlling the transmit power on the control channel by a number of CCEs corresponding to the control channel and bitmap information per Resource Element Group (REG) corresponding to the control channel.

5. A method for receiving messages for inter-cell interference coordination of a source base station and a target base station in a heterogeneous cellular system, the method comprising the steps of:
receiving, by the target base station, from the source base station in a neighbor cell, a resource allocation bitmap indicating an allocation structure of at least one inter-cell interference coordination information, the at least one inter-cell interference coordination information associated with at least one subframe, and time information indicating the at least one subframe; and
applying, by the target base station, the inter-cell interference coordination information to the at least one subframe.

6. The method of claim 5, wherein the at least one inter-cell interference coordination information is destined to one of a neighbor cell operating at a same hierarchical level and a neighbor cell operating at a different hierarchical level, in the heterogeneous cellular system.

7. The method of claim 5, wherein the at least one inter-cell interference coordination information includes one of information for controlling the transmit power of a data channel of a subframe and information for controlling the transmit power of a control channel of the subframe.

8. A transmission apparatus of a source base station for controlling inter-cell interference with a target base station in a heterogeneous cellular system, comprising:
a generator that generates first inter-cell interference coordination information and second inter-cell interference coordination information, the first inter-cell interference coordination information and the second inter-cell interference coordination information being associated with a first subframe and a second subframe, respectively;
a transmitter that transmits, to the target base station, the first inter-cell interference coordination information, the second inter-cell interference coordination information, a resource allocation bitmap indicating an allocation structure of at least one of the first inter-cell interference coordination information and the second inter-cell interference coordination information, and time information indicating at least one of the first subframe and the second subframe; and
a controller that applies the first inter-cell interference coordination information and the second inter-cell interference coordination information to the at least one of the first subframe and the second subframe.

9. The transmission apparatus of claim 8, wherein one of the first inter-cell interference coordination information and the second inter-cell interference coordination information is transmitted to a neighbor base station operating at a same hierarchical level, and another of the first inter-cell interference coordination information and the second inter-cell interference coordination information is transmitted to a neighbor base station operating at a different hierarchical level.

10. The transmission apparatus of claim 8, wherein one of the first inter-cell interference coordination information and the second inter-cell interference coordination information is transmitted for controlling the transmit power of a data channel of a subframe, and another of the first inter-cell interference coordination information and the second inter-cell interference coordination information is transmitted for controlling the transmit power of a control channel of the subframe.

11. The transmission apparatus of claim 10, wherein the one of the first inter-cell interference coordination information and the second inter-cell interference coordination information comprises at least one of:
a representative value obtained by dividing a number of Control Channel Elements (CCEs) for controlling the transmit power on the control channel by a number of CCEs corresponding to the control channel; and
bitmap information per Resource Element Group (REG) corresponding to the control channel.

12. A reception apparatus of a target base station for controlling inter-cell interference with a source base station in a heterogeneous cellular system, comprising:

a receiver that receives, from the source base station in a neighbor cell, a resource allocation bitmap indicating an allocation structure of at least one inter-cell interference coordination information, the at least one inter-cell interference coordination information associated with at least one subframe, and time information indicating the at least one subframe; and a controller that applies the inter-cell interference coordination information to the at least one subframe.

13. The reception apparatus of claim 12, wherein at least one inter-cell interference coordination information is destined to one of a neighbor cell operating at a same hierarchical level and a neighbor cell operating at a different hierarchical level, in the heterogeneous cellular system.

14. The reception apparatus of claim 12, wherein at least one inter-cell interference coordination information includes one of information for controlling the transmit power of a data channel of a subframe and information for controlling the transmit power of a control channel of the subframe.

15. The method of claim 1, wherein the timing information comprises a bitmap indicating the at least one of the first subframe and the second subframe.

16. The method of claim 5, wherein the timing information comprises a bitmap indicating the at least one subframe.

17. The transmission apparatus of claim 8, wherein the timing information comprises a bitmap indicating the at least one of the first subframe and the second subframe.

18. The reception apparatus of claim 12, wherein the timing information comprises a bitmap indicating the at least one subframe.

* * * * *